United States Patent
Rissmann

(10) Patent No.: US 12,015,308 B2
(45) Date of Patent: Jun. 18, 2024

(54) ROTOR FOR AN ELECTRICAL MACHINE

(71) Applicant: Vitesco Technologies Germany GMBH, Regensburg (DE)

(72) Inventor: Ralf Rissmann, Berlin (DE)

(73) Assignee: Vitesco Technologies German GmbH, Regensburg (DE)

(*) Notice: Subject to any disclaimer, the term of this patent is extended or adjusted under 35 U.S.C. 154(b) by 280 days.

(21) Appl. No.: 17/690,651

(22) Filed: Mar. 9, 2022

(65) Prior Publication Data
US 2022/0200377 A1     Jun. 23, 2022

Related U.S. Application Data

(63) Continuation of application No. PCT/EP2020/074323, filed on Sep. 1, 2020.

(30) Foreign Application Priority Data

Sep. 11, 2019  (DE) .......................... 102019213889.6

(51) Int. Cl.
   H02K 1/27      (2022.01)
   H02K 1/276     (2022.01)

(52) U.S. Cl.
   CPC ......... *H02K 1/276* (2013.01); *H02K 2201/06* (2013.01)

(58) Field of Classification Search
   CPC ... H02K 1/276; H02K 1/2766; H02K 2201/06
   See application file for complete search history.

(56) References Cited

U.S. PATENT DOCUMENTS

| | | | | |
|---|---|---|---|---|
| 6,252,323 B1* | 6/2001 | Nishikawa | ............. | H02K 29/03 310/156.01 |
| 6,867,524 B2* | 3/2005 | Liang | ................... | H02K 1/278 310/156.43 |
| 9,876,403 B2* | 1/2018 | Blum | ..................... | H02K 1/276 |
| 2005/0121990 A1* | 6/2005 | Kaneko | ................. | H02K 1/276 310/156.47 |
| 2014/0265702 A1* | 9/2014 | Li | ......................... | H02K 1/276 310/156.38 |

FOREIGN PATENT DOCUMENTS

| | | | |
|---|---|---|---|
| DE | 102012205191 A1 | 10/2013 | |
| EP | 2451049 A1 | 5/2012 | |
| JP | 2008148447 A | 6/2008 | |

OTHER PUBLICATIONS

International Search Report and Written Opinion dated Nov. 16, 2020 from corresponding International Patent Application No. PCT/EP2020/074323.

German Office Action dated Aug. 5, 2020 for corresponding German Patent Application No. 10 2019 213 889.6.

\* cited by examiner

*Primary Examiner* — Naishadh N Desai

(57) ABSTRACT

A rotor for an electric machine, where the rotor has a plurality of annularly formed laminated core segments, which are arranged in succession in the longitudinal direction of the rotor, and each laminated core segment has at least one pocket with a pole component arranged therein, where the pole components arranged in succession in the longitudinal direction of the rotor form a pole assembly, and the pole assembly has a W-shaped progression in relation to its longitudinal direction.

14 Claims, 5 Drawing Sheets

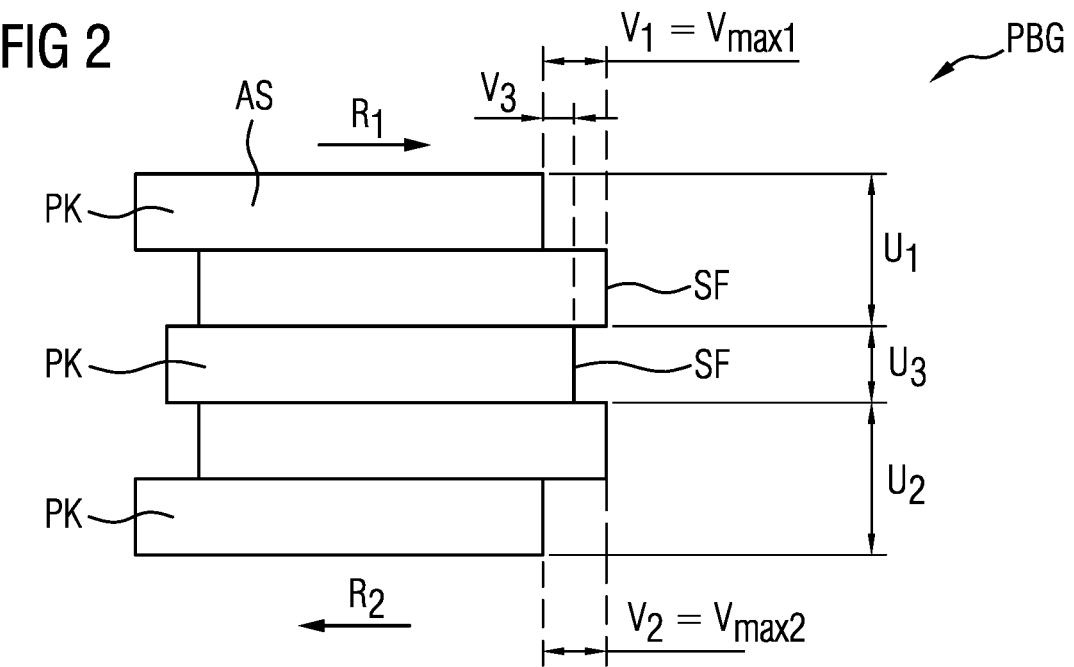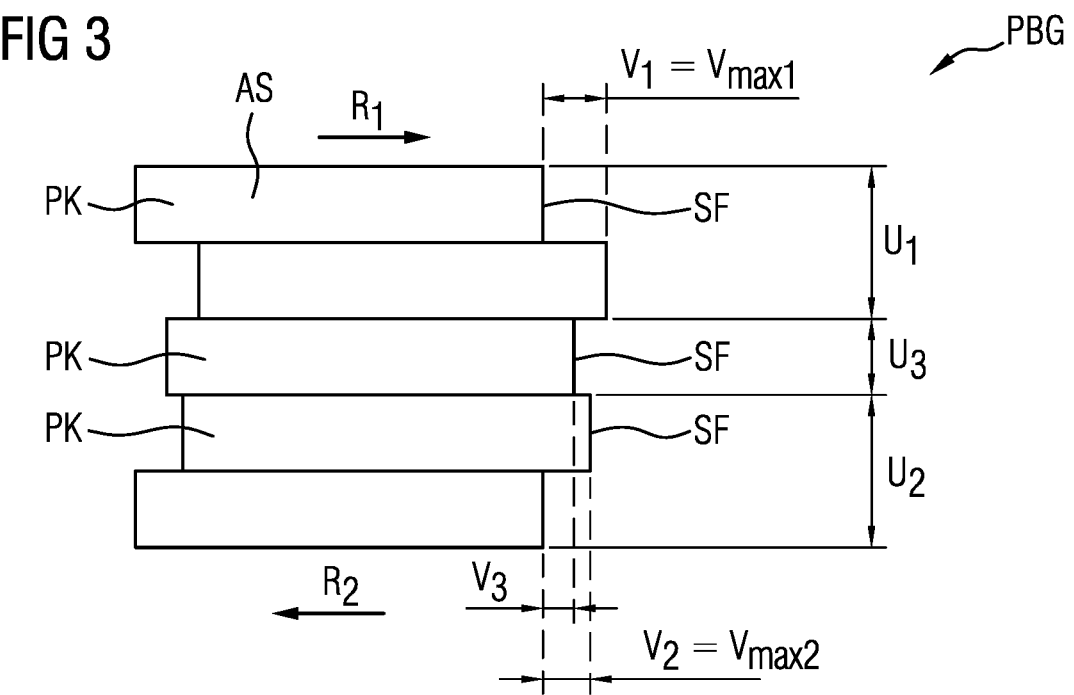

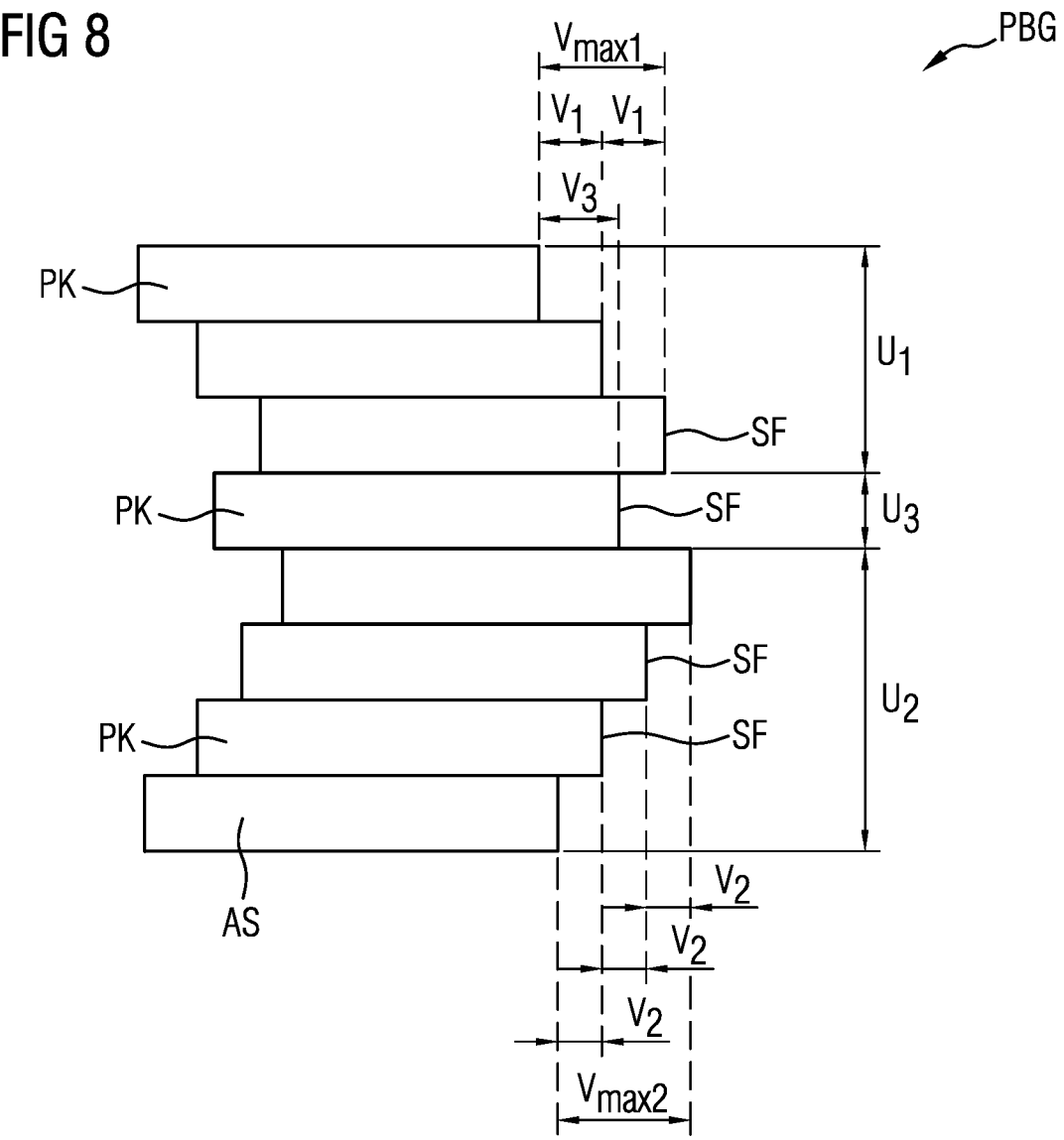

ROTOR FOR AN ELECTRICAL MACHINE

CROSS-REFERENCE TO RELATED APPLICATIONS

This application claims priority to PCT Application PCT/EP2020/074323, filed Sep. 1, 2020, which claims priority to German Patent Application No. DE 10 2019 213 889.6, filed Sep. 11, 2019. The disclosures of the above applications are incorporated herein by reference.

FIELD OF THE INVENTION

The invention relates to a rotor for an electric machine, wherein the rotor includes at least one pole assembly including a plurality of pole components, wherein the pole components have a W-shaped skew relative to a longitudinal direction of the rotor. Moreover, the invention relates to an electric machine having the rotor according to the invention and a motor vehicle having the electric machine according to the invention.

BACKGROUND OF THE INVENTION

Rotors for electric machines are essentially known. The known rotors generally have a plurality of laminated core segments arranged in succession in the longitudinal direction of the rotor. Receptacles and/or pockets for receiving pole components are formed within the laminated core segments. It is furthermore known that the laminated core segments are arranged with respect to one another in such a way that they are arranged offset from one another in the circumferential direction, so that the pole components of a pole assembly have a linear skew, for example. However, a linear skew is not suitable or optimal for every electric machine and may negatively influence the vibration and noise behavior of the electric machine.

SUMMARY OF THE INVENTION

The object of the invention is to specify a rotor for an electric machine, with which the vibration and/or noise generation of the electric machine may be reduced.

This object is achieved by the subject matter described. Additional developments of the invention are specified in the description and the figures, wherein each feature may constitute an aspect of the invention both individually and in combination.

According to the invention, a rotor for an electric machine is provided, having a plurality of annularly formed laminated core segments, which are arranged in succession in the longitudinal direction of the rotor, wherein each laminated core segment has at least one pocket with a pole component arranged therein, which includes a side face parallel to the longitudinal direction of the rotor, wherein the pole components arranged in succession in the longitudinal direction of the rotor form a pole assembly, and the pole assembly has a first subassembly, a second subassembly and a third subassembly, wherein the third subassembly is arranged between the first subassembly and the second subassembly, the laminated core segments are arranged offset from one another in the circumferential direction in such a way that the first subassembly and the second subassembly each includes a plurality of pole components, and the third subassembly has a pole component, the pole components of the first subassemblies are arranged offset from one another in such a way in a first direction, wherein the side faces of the pole components of the first subassembly have a first offset from one another, and the sum of the first offsets of the first pole components of the first subassembly forms a first maximum offset, the pole components of the second subassembly are arranged offset from one another in such a way in a second direction, which is contrary to the first direction, wherein the side faces of the pole components of the second subassembly have a second offset from one another, and the sum of the second offsets of the pole components of the second subassembly forms a second maximum offset, and the side face of the pole component of the third subassembly has a third offset in relation to the respective side face of the pole component of the first subassembly, which has the greatest spacing from the pole component of the third subassembly in the axial direction of the rotor, wherein the amount of the third offset is smaller than the amount of the first maximum offset and smaller than the amount of the second maximum offset.

In other words, an aspect of the present invention is that a rotor for an electric machine is provided, which has a plurality of annularly formed laminated core segments, which are arranged in succession in the axial direction of the rotor. The respective laminated core segments generally have a plurality of lamination sheets, which are identical for a laminated core segment and are combined to form a laminated core segment.

Each laminated core segment has at least one pocket with a pole component arranged therein. Each laminated core generally has a plurality of pockets spaced from one another in the circumferential direction, wherein a pole component is arranged in each pocket. The pole components may also be referred to as a magnet or as a permanent magnet.

A pocket cross-section and/or a pocket arrangement may be arranged and/or formed linearly and/or in a V shape.

The pole component arranged in the laminated core segment has a side face parallel to the longitudinal direction of the rotor. The side face is in an embodiment aligned and/or formed in the circumferential direction of the rotor or in the circumferential direction of the annularly formed laminated core segment.

The pole components arranged in succession in the longitudinal direction of the rotor form a pole assembly. The pole assembly includes a first subassembly, a second subassembly and a third subassembly. In this case, it is provided that the third subassembly is arranged between the first subassembly and the second subassembly. Both the first subassembly and the second subassembly each have a plurality of pole components. In other words, the first subassembly may have for example 2, 3, 4, 5, 6, 7 or more pole components. It may likewise be provided that the second subassembly has 2, 3, 4, 5, 6, 7 or more pole components. The third subassembly includes only one pole component.

The laminated core segments are arranged offset from one another in the circumferential direction, wherein the pole components of the first subassembly are arranged offset from one another in a first direction in such a way that the side faces of the pole components of the first subassembly have a first offset from one another. In other words, the pole components of the first subassembly are arranged offset from one another in the circumferential direction of the rotor, wherein the first offset is formed between the respective side faces of the pole components. The sum of the first offsets of the pole components of the first subassembly form a first maximum offset.

$$V_{max1} = \sum_{i=1}^{\infty} V1_i$$

The pole components of the second subassembly are arranged offset from one another in a second direction, which is contrary to the first direction, in such a way that the side faces of the pole components of the second subassembly have a second offset from one another. The pole components of the second subassembly are therefore also offset from one another in the circumferential direction, wherein the direction of the offset of the pole components of the first subassembly is different from the direction of the offset of the pole components of the second subassembly. In other words, the first direction is contrary to the second direction. The sum of the offsets of the pole components of the second subassembly form a second maximum offset.

$$V_{max2} = \sum_{i=1}^{\infty} V2_i$$

The side face of the pole component of the third subassembly has a third offset in relation to the respective side face of the pole component of the first subassembly and the second subassembly which has the greatest spacing from the first pole component of the third subassembly in the axial direction of the rotor, wherein the amount of the third offset is smaller than the amount of the first maximum offset on the one hand and smaller than the amount of the second maximum offset on the other.

$$|V_{max1}| > |V3| < |V_{max2}|$$

The pole assembly thus has a W-shaped progression in the longitudinal direction of the pole assembly.

The rotor is generally rotatably mounted and arranged spaced from a stator surrounding the rotor via an air gap. There is a time- and location-dependent force distribution in the radial, tangential and axial direction in this air gap. This force distribution is essentially influenced by the design of the rotor and may excite the stator and result in vibration and/or noise generation. Skewing the laminated core segments of a rotor in such a way that the pole components of a pole assembly have a W-shaped progression may positively influence the noise vibration harshness behavior of the electric machine and reduce vibrations and/or the noise generation of the stator. Forces acting in the axial direction and/or their influence on the stator may be reduced and/or eliminated. Moreover, the force distribution of the radial and/or tangential forces may be adapted such that eigenmodes of the stator are excited to a lesser extent or not at all.

In an embodiment of the invention, it is provided that the amount of the first maximum offset corresponds equally to the amount of the second maximum offset.

In other words, the sum of the first offsets of the pole components of the first subassembly is equal to the sum of the second offsets of the pole components of the second subassembly.

$$|V_{max1}| = |V_{max2}|$$

Alternatively to this, an embodiment of the invention consists in that the second maximum offset is different from the first maximum offset. In other words, the sum of the first offsets of the pole components of the first subassembly may be greater or smaller than the sum of the offsets of the pole components of the second subassembly. In this way, the pole assembly may have a W-shaped progression over the longitudinal direction of the pole assembly, which is non-uniform or asymmetrical.

$$|V_{max1}| < |V_{max2}| \text{ or } |V_{max1}| > |V_{max2}|$$

It is provided that the first offsets between the side faces of the pole components of the first subassembly and/or the second offsets between the side faces of the pole components of the second subassembly are always the same size. In other words, the first subassembly may comprise three pole components, for example, wherein the respective first offset of the side faces of the successive pole components is always the same size. It may likewise be provided that the respective second offset of the side faces of the mutually spaced pole components of the second subassembly is always the same size. However, it is not imperative that both the first offsets must be the same size if the second offsets are the same size. By way of example, the first offsets may also be different from one another, whilst the second offsets are the same size.

Alternatively and/or additionally to this, it may be provided that the first offsets between the side faces of the pole components of the first subassembly and/or the second offsets between the side faces of the pole components of the second subassembly are different from one another. It is thus conceivable that the first subassembly has three laminated core segments with corresponding pole components, wherein the first offsets between the side faces of the successive pole components are different from one another. The same also applies for the second offsets. However, it is also conceivable that the first offsets of the pole components of the first subassembly are the same size, whilst the second offsets of the pole components of the second subassembly are different from one another.

An embodiment of the invention may essentially provide that, within the pole assembly, the number of pole components of the first subassembly is equal to the number of pole components of the second subassembly.

It may alternatively be provided that, within the pole assembly, the number of pole components of the first subassembly is different from the number of pole components of the second subassembly. In other words, it may be provided that the first subassembly has three laminated core segments with corresponding pole components, wherein the second subassembly includes four laminated core segments with corresponding pole components. In this way, the pole assembly may have a W-shaped progression in the longitudinal direction of the pole assembly, which is non-uniform and/or asymmetrical.

In an embodiment of the invention, it is provided that the pole components of the first subassembly and the pole components of the second subassembly have offset positions, wherein the offset position of the first subassembly is identical to the offset position of the second subassembly. An offset position defines the position of the pocket in which the pole component is arranged within the laminated core segment. In other words, the pole components of the first subassembly are formed to mirror the pole components of the second subassembly about an axis perpendicular to the longitudinal direction of the pole assembly. In this way, a uniform or symmetrical W-shaped progression of the pole components in relation to the longitudinal direction of the pole assembly may be achieved.

An embodiment development of the invention consists in that the pole component of the third subassembly has an offset position, wherein the offset position of the pole component of the third subassembly corresponds to an offset position of the pole component of the first subassembly and/or an offset position of the pole component of the second subassembly. It may therefore be provided that the side face of the pole component of the third subassembly is flush with a side face of the pole component of the first subassembly on the one hand and with a side face of a pole component of the second subassembly on the other. In this way, the number of offset positions of the pole components may be reduced.

In an embodiment of the invention, it is provided that the rotor has a plurality of pole assemblies spaced from one another in the circumferential direction.

It is conceivable that the pole components have different dimensions and/or forms. An embodiment of the invention consists in that all pole components have identical dimensions.

The invention relates to an electric machine having the rotor according to the invention and a motor vehicle having the electric machine according to the invention.

Further features of the invention emerge from the following exemplary embodiments. The exemplary embodiments are not to be understood as restrictive, but rather as given by way of example. They are intended to enable a person skilled in the art to carry out the invention. The applicant reserves the right to make one or more of the features disclosed in the exemplary embodiments. The exemplary embodiments are explained in more detail on the basis of figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the drawings:

FIGS. 2 to 8 show different examples of an arrangement of pole components within the pole assembly.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
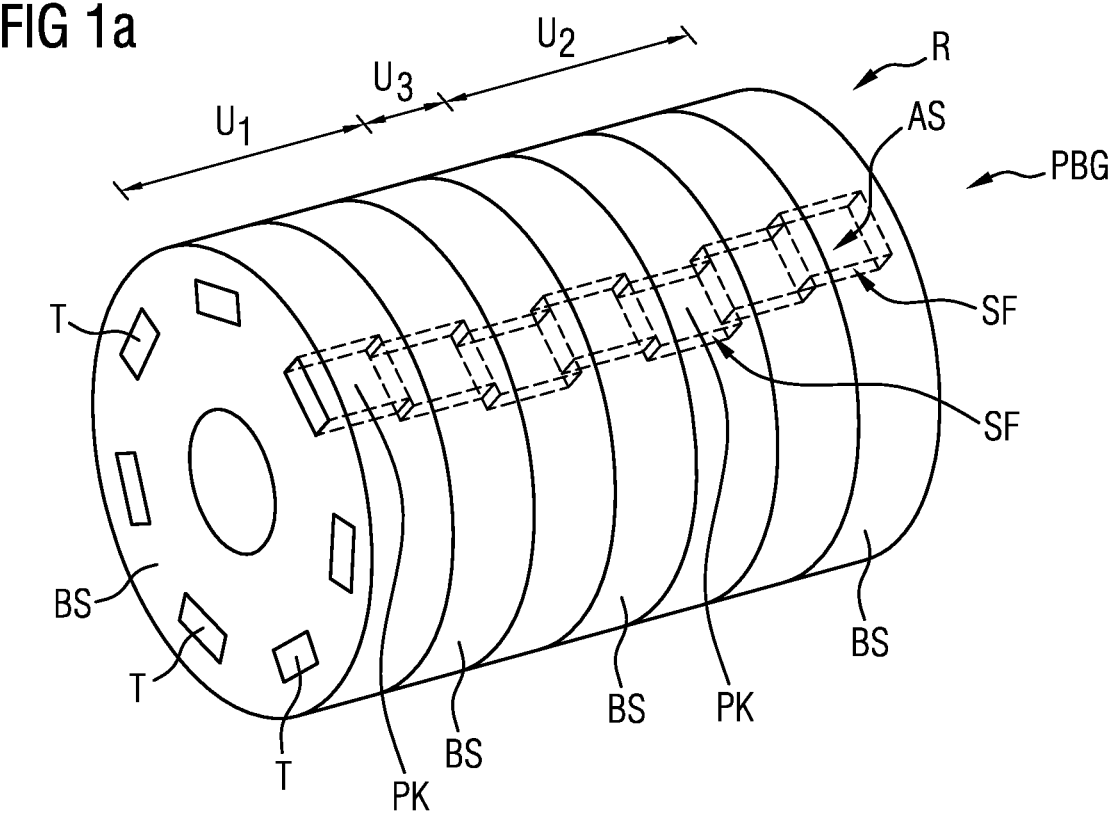
FIG. 1a shows a three-dimensional view of a rotor of an electric machine with a pole assembly.
Figure 1B:
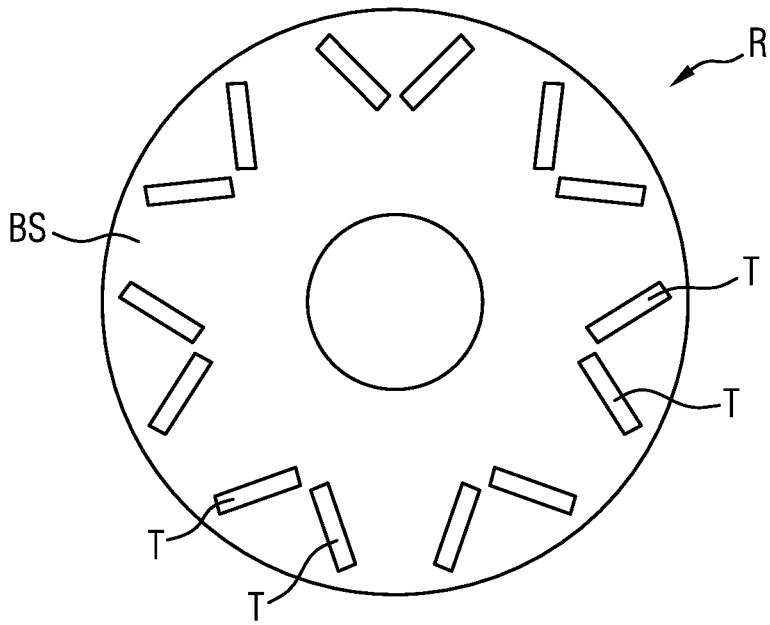
FIG. 1b shows a plan view of a laminated core of the rotor.

A three-dimensional view of a rotor R for an electric machine is shown in FIG. 1a. The rotor R has a plurality of annularly formed laminated core segments BS, which are arranged in succession in a longitudinal direction of the rotor R. Each laminated core segment BS has at least one pocket T with a pole component PK arranged therein. The pole components PK may also be referred to as a magnet, such as a permanent magnet.

In the present exemplary embodiment, each laminated core segment BS has a plurality of pockets T arranged spaced from one another in the circumferential direction, wherein the pockets T have a rectangular opening, which has a linear progression in the tangential direction of the laminated core segment BS. The pockets T may essentially also be formed and/or arranged in a V shape, as is shown by way of example in FIG. 1a.

The pole component PK has an outer side AS in the radial direction of the rotor R and a side face SF parallel to the longitudinal direction of the rotor R. The pole components PK arranged in succession in the longitudinal direction of the rotor R form a pole assembly PBG.

The pole assembly PBG includes a first subassembly $U_1$, a second subassembly $U_2$ and a third subassembly $U_3$, wherein the third subassembly $U_3$ is arranged between the first subassembly $U_1$ and the second subassembly $U_2$.

Both the first subassembly $U_1$ and the second subassembly $U_2$ each have a plurality of pole components PK. The third subassembly $U_3$ has only one pole component PK. The pole components PK of the pole assembly PBG are arranged with respect to one another in the longitudinal direction of the pole assembly PBG or in the longitudinal direction of the rotor R in such a way that they have and/or form a W-shaped progression over the longitudinal direction of the pole assembly PBG.

FIGS. 2 to 8 show different configurations of an arrangement of pole components PK within the pole assembly PBG for a varying number of laminated core segments BS. FIGS. 2 to 8 are confined to merely illustrating the pole components PK. The rotor R and the laminated core segments BS are not illustrated in FIGS. 2 to 8.

A pole assembly PBG according to a first exemplary embodiment is illustrated in FIG. 2. The rotor R of this exemplary embodiment includes five laminated core segments BS arranged in succession in the longitudinal direction of the rotor R. The pole assembly PBG thus includes five pole components PK arranged in succession in the longitudinal direction of the pole assembly PBG. The pole assembly PBG has a first subassembly $U_1$, a second subassembly $U_2$ and a third subassembly $U_3$ arranged between the first subassembly $U_1$ and the second subassembly $U_2$. The first subassembly $U_1$ and the second subassembly $U_2$ each have two pole components PK. The third subassembly $U_3$ includes one pole component PK. The pole components PK of the first subassembly $U_1$ are arranged offset from one another in a first direction $R_1$ in such a way that the side faces SF of the pole components PK of the first subassembly have a first offset $V_1$ from one another. The sum of the first offsets $V_1$ of the pole components PK of the first subassembly $U_1$ form a first maximum offset $V_{max1}$. With only two pole components PK of the first subassembly, the first offset $V_1$ corresponds to the first maximum offset $V_{max1}$.

The pole components PK of the second subassembly $U_2$ are arranged offset from one another in a second direction $R_2$, which is contrary to the first direction $R_1$, in such a way that the side faces SF of the pole components PK of the second subassembly $U_2$ have a second offset $V_2$ from one another, and the sum of the second offsets $V_2$ of the pole components PK of the second subassembly $U_2$ forms a second maximum offset $V_{max2}$. The side face SF of the pole component PK of the third subassembly $U_3$ has a third offset $V_3$ in relation to the respective side face SF of the pole component PK of the first subassembly $U_1$ and the second subassembly $U_2$ which has the greatest spacing from the pole component PK of the third subassembly $U_3$ in the axial direction of the rotor R. The amount of the third offset $V_3$ is smaller than the amount of the first maximum offset $V_{max1}$ and smaller than the amount of the second maximum offset $V_{max2}$.

It may furthermore be seen that, in the first exemplary embodiment, the amount of the first maximum offset Vmax1 is equal to the amount of the second maximum offset $V_{max2}$. Moreover, the pole components PK of the first subassembly $U_1$ and the pole components PK of the second subassembly $U_2$ have offset positions, wherein the offset positions of the pole components PK of the first subassembly $U_1$ are identical to the offset positions of the pole components PK of the second subassembly $U_2$. In other words, the pole components PK of the first subassembly $U_1$ are formed and/or arranged to mirror the pole components of the second subassembly $U_2$ about an axis perpendicular to the longitudinal direction of the pole assembly PBG. In this way, the pole assembly PBG has a uniformly formed W-shaped progression in the longitudinal direction.

A pole assembly PBG according to a second exemplary embodiment is shown in FIG. 3. In contrast to the pole assembly PBG shown in FIG. 2, the second subassembly $U_2$ has two pole components PK, wherein the second offset $V_2$ is different from the first offset $V_1$ of the pole components PK of the first subassembly $U_1$. Moreover, the amount of the second maximum offset $V_{max2}$ is smaller than the amount of the first maximum offset $V_{max1}$ The third offset V3 is smaller than the second maximum offset $V_{max2}$. The pole assembly PBG therefore has a W-shaped progression in its longitudinal direction, which is non-uniform.

FIGS. 4 to 7 each show a pole assembly PBG with seven pole components PK arranged in succession. The rotor R thus has a total of seven laminated core segments BS arranged in succession.

Figure 4:
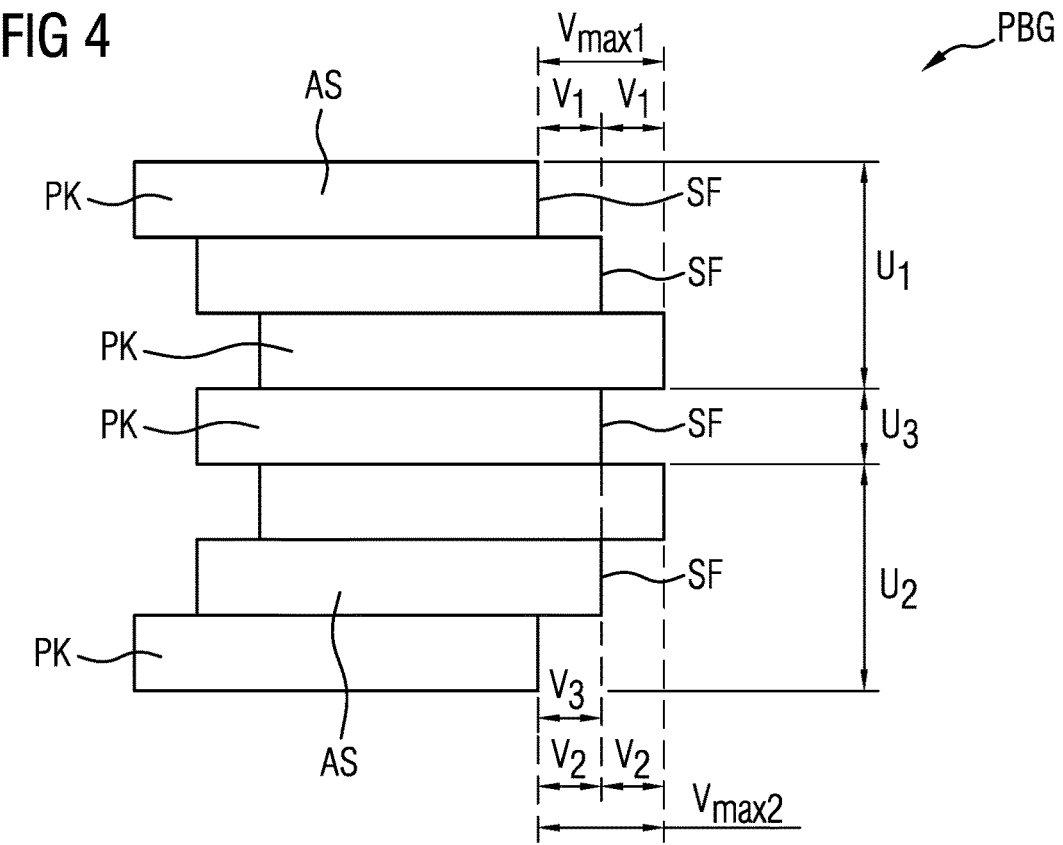

In FIG. 4, the first subassembly $U_1$ and the second subassembly $U_2$ each have three pole components PK. The respective pole components PK of the first subassembly $U_1$ each have a uniform first offset $V_1$. The pole components PK of the third subassembly $U_3$ likewise each have a uniform second offset $V_2$. Moreover, the amount of the first maximum offset $V_{max1}$ is equal to the amount of the second maximum offset $V_{max}$. The pole components PK of the first subassembly $U_1$ and the pole components PK of the second subassembly $U_2$ furthermore have offset positions, wherein the offset positions of the pole components PK of the first subassembly $U_1$ are identical to the offset of the pole components PK of the second subassembly $U_2$. In other words, the pole components PK of the first subassembly $U_1$ are arranged to mirror the pole components PK of the second subassembly $U_2$ about an axis perpendicular to the pole assembly PBG.

Moreover, the side face SF of the pole component PK of the third subassembly $U_3$ has a third offset $V_3$ in relation to the respective side face SF of the pole component of the first subassembly and the second subassembly $U_2$ which has the greatest spacing from the pole component PK of the third subassembly $U_3$ in the axial direction of the rotor R, wherein the amount of the third offset $V_3$ is smaller than the amount of the first maximum offset $V_{max1}$ and is smaller than the amount of the second maximum offset $V_{max2}$.

It may furthermore be seen that the pole component PK of the third subassembly $U_3$ has an offset position, which corresponds to an offset position of a pole component PK of the first subassembly $U_1$ and the second subassembly $U_2$.

In an embodiment, it is provided that the amount of the first offset the amount of the second offset $V_2$ and the amount of the third offset $V_3$ is the same. By way of example, the amount of the first offset $V_1$, the second offset $V_2$ and the third offset $V_3$ may be 2.887° in each case.

In this way, the number of offset positions may be reduced. In other words, the costs may be reduced since the number of varying lamination cross-sections of the laminated core segments BS may be reduced.

Figure 5:
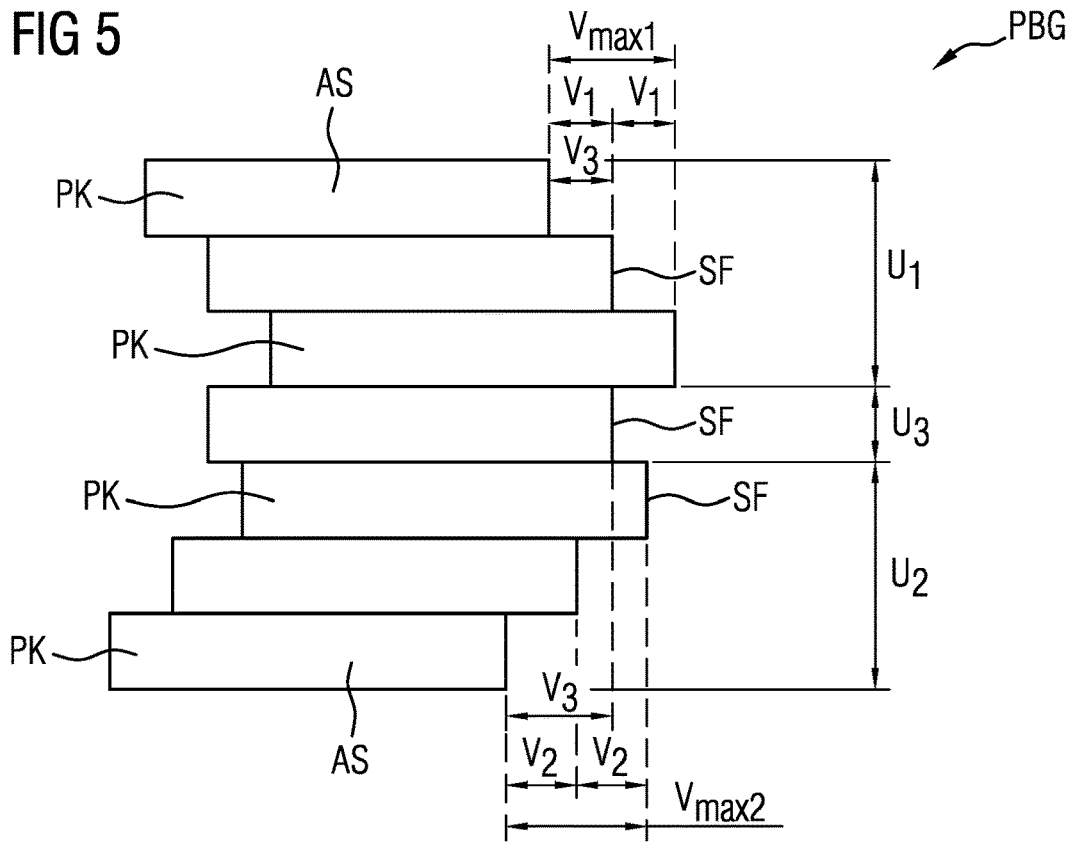

FIG. 5 shows a pole assembly PBG according to a fourth exemplary embodiment. In contrast to the exemplary embodiment shown in FIG. 4, the offset positions of the pole components PK of the first subassembly $U_1$ do not correspond to the offset positions of the pole components PK of the second subassembly $U_2$. The offset positions of the pole components PK of the first subassembly $U_1$ are thus different from the offset positions of the pole components PK of the second subassembly $U_2$. In the present exemplary embodiment, the offset position of the pole component PK of the third subassembly $U_3$ corresponds to an offset position of a pole component PK of the first subassembly $U_1$. The pole assembly PBG therefore has a W-shaped progression in the longitudinal direction of the pole assembly PBG, which is non-uniform.

Figure 6:
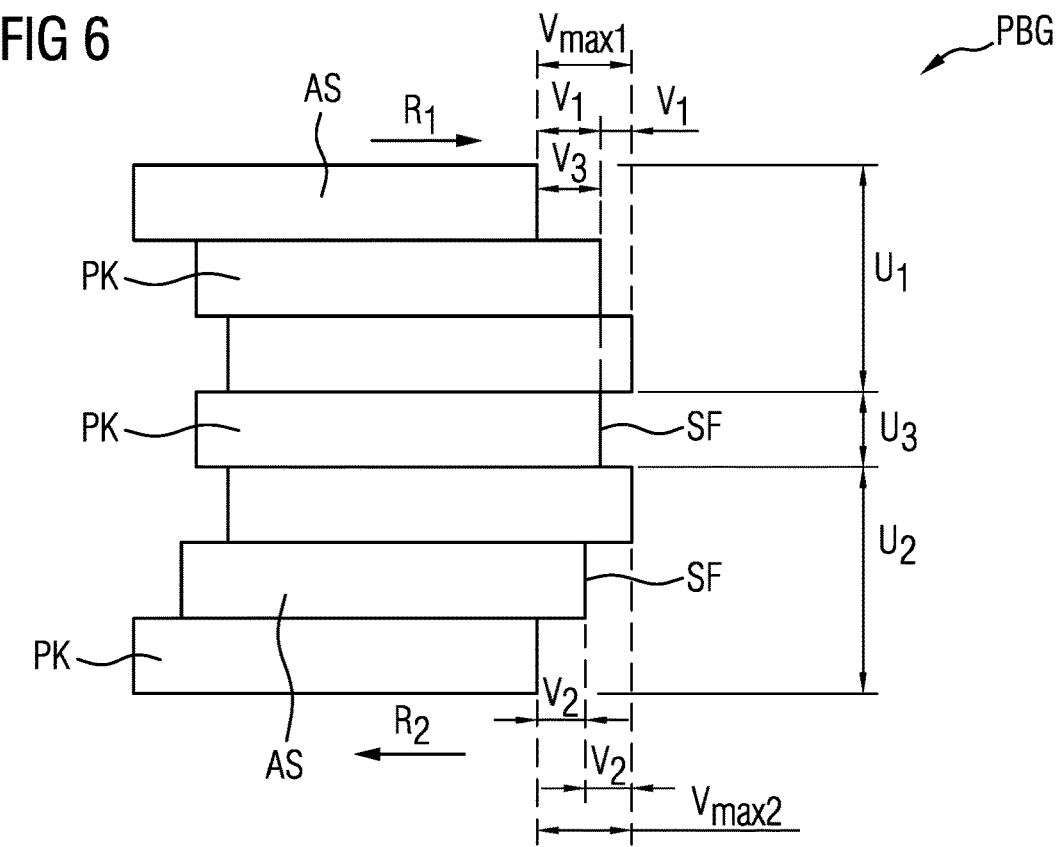

A pole assembly PBG according to a fifth exemplary embodiment is shown in FIG. 6. In contrast to the exemplary embodiment shown in FIG. 4, the first offsets $V_1$ between the side faces SF of the pole components PK of the first subassembly $U_1$ are designed to be different from one another in terms of their size. The second offsets $V_2$ between the side faces SF of the pole components PK of the second subassembly $U_2$ are each designed to be the same size. It may furthermore be seen that the amount of the first maximum offset $V_{max1}$ is smaller than the amount of the second maximum offset $V_{max2}$. The amount of the third offset $V_3$ is smaller than the first maximum offset $V_{max1}$.

Figure 7:
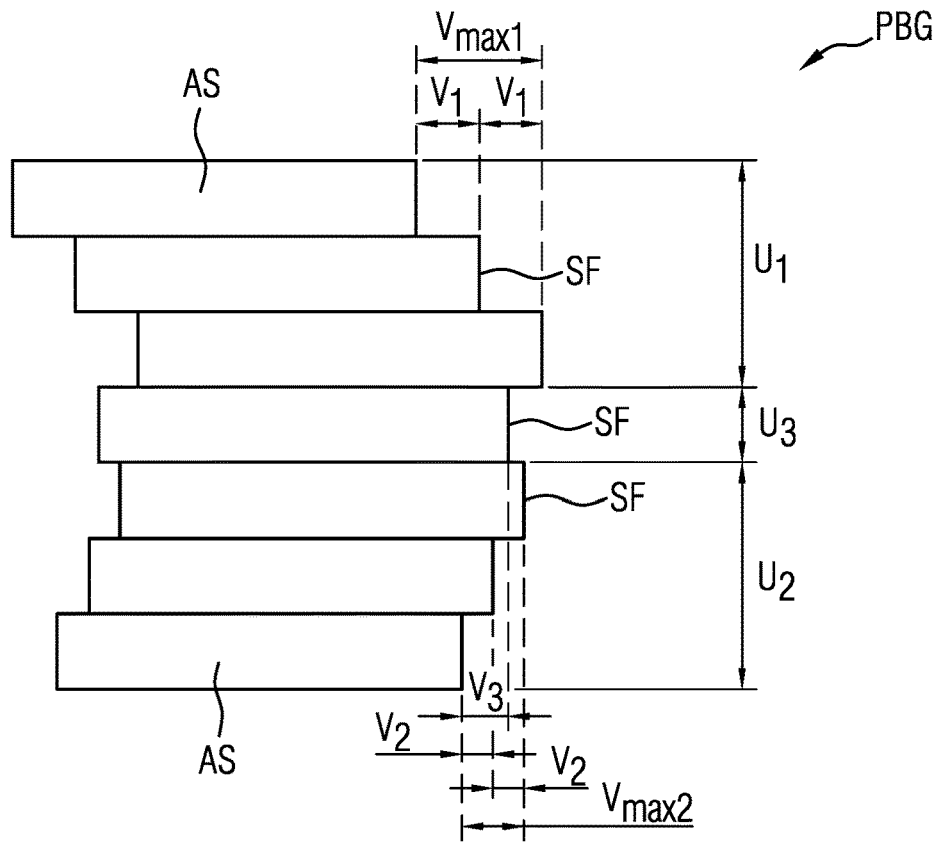

A pole assembly PBG according to a sixth exemplary embodiment is shown in FIG. 7. The first offsets $V_1$ of the pole components PK of the first subassembly $U_1$ are the same size. The second offsets $V_2$ of the pole components PK of the second subassembly are likewise the same size within the subassembly. However, an amount of the first offset $V_1$ of the pole component PK of the first subassembly $U_1$ is different from an amount of the second offset $V_2$ of the second pole component PK of the second subassembly $U_2$. In the present exemplary embodiment, the amount of the first offset $V_1$ is greater than the amount of the second offset $V_2$. Moreover, the amount of the first maximum offset $V_{max1}$ is greater than the amount of the second maximum offset $V_{max2}$. The offset position of the pole component PK of the third subassembly $U_3$ is different from the offset positions of the pole components PK of the first subassembly $U_1$ and from the offset positions of the pole components PK of the second subassembly $U_2$. The pole assembly PBG has a W-shaped progression over its longitudinal extent, which is non-uniform.

A pole assembly PBG with eight pole components PK arranged in succession is shown in FIG. 8. In other words, the rotor R has a total of eight laminated core segments BS arranged in succession. The first subassembly $U_1$ includes three pole components PK and the second subassembly $U_2$ includes four pole components PK. The first offsets $V_1$ between the side faces SF of the pole components PK of the first subassembly $U_1$ are the same size. The second offsets $V_2$ between the side faces SF of the pole components PK of the second subassembly $U_2$ are likewise the same size. The amount of the first offset $V_1$ is, however, greater than the amount of the second offset $V_2$. Owing to the smaller number of pole components PK of the first subassembly $U_1$ compared to the number of pole components PK of the second subassembly $U_2$, the amount of the first maximum offset $V_{max1}$ of the first subassembly $U_1$ is smaller than the amount of the second maximum offset $V_{max2}$ of the second subassembly $U_2$. The amount of the third offset $V_3$ is both smaller than the amount of the first maximum offset $V_{max1}$ and smaller than the amount of the second maximum offset $V_{max2}$. Owing to the even number of laminated core segments BS or pole components PK and the fact that the third subassembly $U_3$ has only one pole component PK, the pole assembly PBG has a non-uniform progression in the form of a W over its longitudinal extent.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotor for an electric machine, comprising:
   a plurality of annularly formed laminated core segments, which are arranged in succession in a longitudinal direction of the rotor;
   a plurality of pockets, at least one of the plurality of pockets formed as part of a corresponding one of the plurality of annularly formed laminated core segments;
   a plurality of pole components, each of the plurality of pole components disposed in a corresponding one of the plurality of pockets, each of the pole components having a side face parallel to the longitudinal direction of the rotor;
   a pole assembly formed by each of the plurality of pole components arranged in succession in the longitudinal direction of the rotor, the pole assembly further comprising:
      a first subassembly having more than one of the plurality of pole components;
      a second subassembly having more than one of the plurality of pole components; and
      a third subassembly having one of the plurality of pole components, the third subassembly arranged between the first subassembly and the second subassembly;
   a first offset, the first offset being the distance between the side faces of each of the pole components of the first subassembly, the first offset formed by the plurality of annularly formed laminated core segments arranged offset from one another in the circumferential direction in such a way that the plurality of pole components of the first subassembly are arranged offset from one another in a first direction;
   a first maximum offset being the combined sum of each first offset of the plurality of pole components of the first subassembly;
   a second offset, the second offset being the distance between the side faces of the plurality of pole components of the second subassembly, the second offset formed by the plurality of annularly formed laminated core segments arranged offset from one another in the circumferential direction in such a way that the plurality of pole components of the second subassembly are arranged offset from one another in such a way in a second direction, which is contrary to the first direction;
   a second maximum offset being the combined sum of each second offset of the plurality of pole components of the second subassembly; and
   a third offset, the third offset being the greater spacing from the side face of the pole component of the third subassembly in the axial direction of the rotor to either the side faces of the plurality of pole components of the first subassembly or the side faces of the plurality of pole components of the second subassembly;
   wherein the amount of the third offset is smaller than the amount of the first maximum offset and, the third offset is smaller than the amount of the second maximum offset.

2. The rotor of claim 1, wherein the amount of the first maximum offset is equal to the amount of the second maximum offset.

3. The rotor of claim 1, wherein the amount of the second maximum offset is different from the amount of the first maximum offset.

4. The rotor of any of claim 1, wherein the first offset between each of the side faces of the plurality of pole components of the first subassembly and the second offset between the each of the side faces of the plurality of pole components of the second subassembly are always the same size.

5. The rotor of any of claim 1, wherein the first offset between each of the side faces of the plurality of pole components of the first subassembly or the second offset between the each of the side faces of the plurality of pole components of the second subassembly are always the same size.

6. The rotor of any of claim 1, wherein the first offsets between each of the side faces of the plurality of pole components of the first subassembly and the second offsets between each of the side faces of the plurality of pole components of the second subassembly are different from one another.

7. The rotor of any of claim 1, wherein the first offsets between each of the side faces of the plurality of pole components of the first subassembly or the second offsets between each of the side faces of the plurality of pole components of the second subassembly are different from one another.

8. The rotor of any of claim 1, wherein, within the pole assembly, the number of the plurality of pole components of the first subassembly is equal to the number of the plurality of pole components of the second subassembly.

9. The rotor of any of claim 1, wherein, within the pole assembly, the number of pole components of the first subassembly is different from the number of pole components of the second subassembly.

10. The rotor of claim 1, wherein the plurality of pole components of the first subassembly have offset positions, and the plurality of pole components of the second subassembly have offset positions, and the offset positions of the plurality of pole components of the first subassembly are identical to the offset positions of the plurality of pole components of the second subassembly.

11. The rotor of claim 10, wherein the pole component of the third subassembly has an offset position, which corresponds to an offset position of a pole component of the first subassembly and an offset position of the second subassembly.

12. The rotor of any of claim 1, further comprising a plurality of pole assemblies spaced from one another in the circumferential direction.

13. The rotor of any of claim 1, wherein the rotor is part of an electric machine.

14. The rotor of any of claim 1, wherein the electric machine is part of a motor vehicle.

* * * * *